United States Patent [19]

Pearson

[11] Patent Number: 5,768,649
[45] Date of Patent: Jun. 16, 1998

[54] LENS ASSEMBLY WITH ENGAGEABLE LENS RETAINER AND LENS MOUNT

[75] Inventor: Douglas H. Pearson, Rochester, N.Y.

[73] Assignee: Eastman Kodak Company, Rochester, N.Y.

[21] Appl. No.: 812,658

[22] Filed: Mar. 6, 1997

[51] Int. Cl.$^6$ ............................................. G03B 17/00
[52] U.S. Cl. ................................. 396/529; 359/819
[58] Field of Search ...................... 396/6, 529; 359/819

[56] References Cited

U.S. PATENT DOCUMENTS

| 5,181,057 | 1/1993 | Takagi et al. |
| 5,461,444 | 10/1995 | Okura et al. |
| 5,608,486 | 3/1997 | Takagi et al. ........................ 396/529 X |

Primary Examiner—Howard B. Blankenship
Attorney, Agent, or Firm—Roger A. Fields

[57] ABSTRACT

A lens assembly for a camera comprising a taking lens, a lens mount having a light-admitting opening and several engageable members, and a lens retainer having a light-admitting opening and several engageable members equal in number to the engageable members of the lens mount to permit the respective engageable members of the lens retainer and the lens mount to mutually engage to connect the lens mount and the lens retainer to one another with the taking lens located between the lens mount and the lens retainer in optical alignment with the respective light-admitting openings, is characterized in that the lens retainer has at least one retaining member that engages the taking lens to hold the taking lens securely to the lens retainer in optical alignment with the light-admitting opening of the lens retainer, to permit the lens retainer to be connected with the taking lens intact to the lens mount.

10 Claims, 3 Drawing Sheets

LENS ASSEMBLY WITH ENGAGEABLE LENS RETAINER AND LENS MOUNT

FIELD OF THE INVENTION

The invention relates generally to the field of photography, and in particular to a lens assembly for a camera.

BACKGROUND OF THE INVENTION

Prior art U.S. Pat. No. 5,181,057, issued Jan. 19, 1993 appears to disclose a lens assembly for a one-time-use camera, comprising a taking lens, a lens mount or holder having a centered light-admitting opening and several surrounding engageable means, and a lens retainer or securing ring having a centered light-admitting opening and several surrounding engageable means equal in number to the engageable means of the lens mount to permit the respective engageable means of the lens retainer and the lens mount to mutually engage to connect the lens mount and the lens retainer to one another with the taking lens located between the lens mount and the lens retainer in optical alignment with the respective light-admitting openings. During camera manufacture, it appears that first the taking lens is positioned between the lens retainer and the lens mount in optical alignment with the respective light-admitting openings of the lens retainer and the lens mount, and then the respective engageable means of the lens retainer and the lens mount are mutually engaged to connect the lens mount and the lens retainer. This approach can be rather awkward.

SUMMARY OF THE INVENTION

According to the invention, a lens assembly for a camera comprising a taking lens, a lens mount having a light-admitting opening and several engageable members, and a lens retainer having a light-admitting opening and several engageable members equal in number to the engageable members of the lens mount to permit the respective engageable members of the lens retainer and the lens mount to mutually engage to connect the lens mount and the lens retainer to one another with the taking lens located between the lens mount and the lens retainer in optical alignment with the respective light-admitting openings, is characterized in that:

The lens retainer has at least one retaining member that engages the taking lens to hold the taking lens securely to the lens retainer in optical alignment with the light-admitting opening of the lens retainer, to permit the lens retainer to be connected with the taking lens intact to the lens mount. This is a simplified approach as compared to the one suggested in prior art U.S. Patent No. 5,181,057.

DETAILED DESCRIPTION OF THE INVENTION

The invention is disclosed as being embodied preferably in a lens assembly for a camera. Because the features of a lens assembly for a camera are generally known, the description which follows is directed in particular only to those elements forming part of or cooperating directly with the disclosed embodiment. It is to be understood, however, that other elements may take various forms known to a person of ordinary skill in the art.

Figure 1:
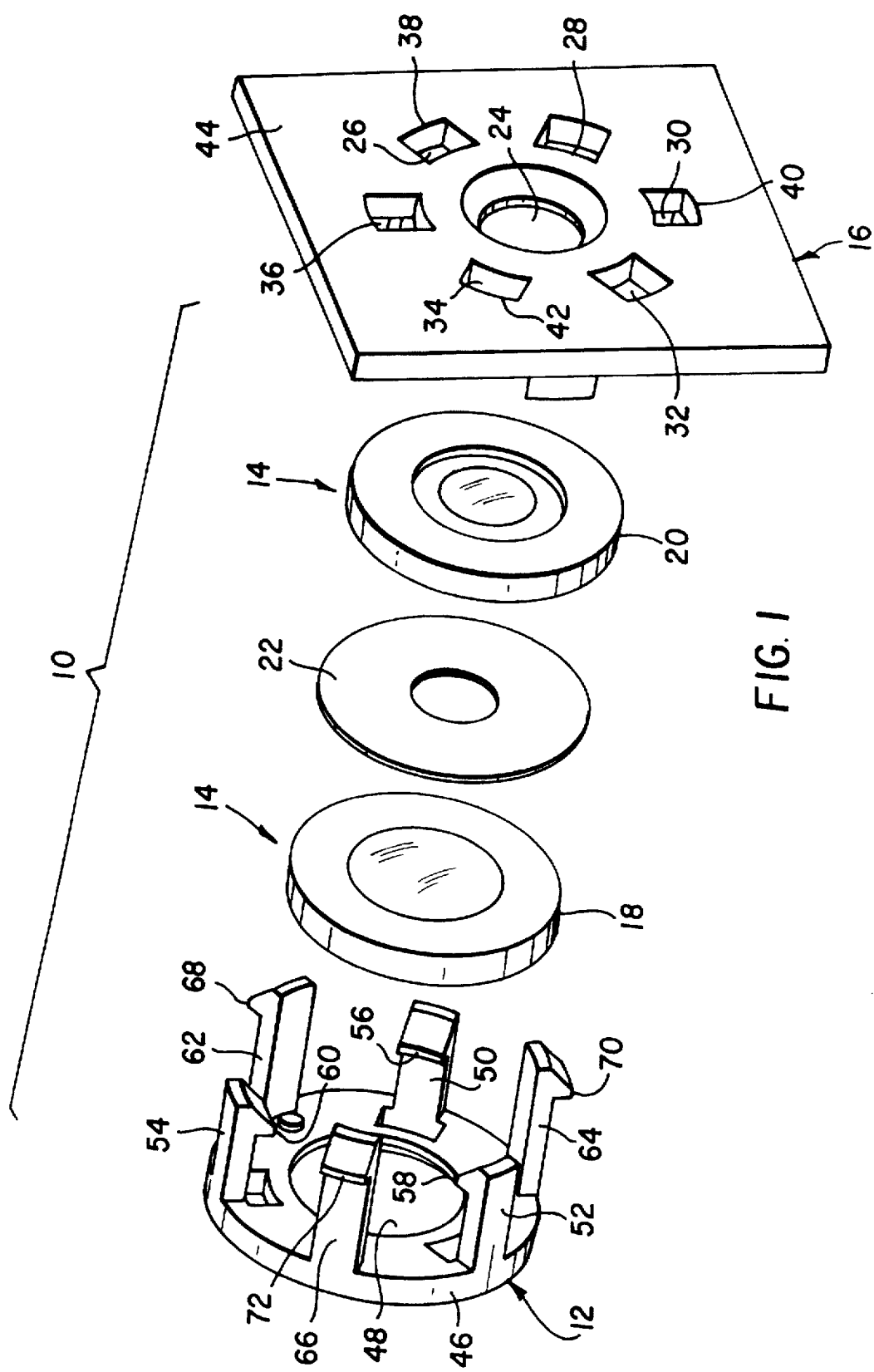
FIG. 1 is an exploded perspective view of a lens assembly pursuant to a preferred embodiment of the invention, viewing the lens assembly from its rear.
Figure 2:
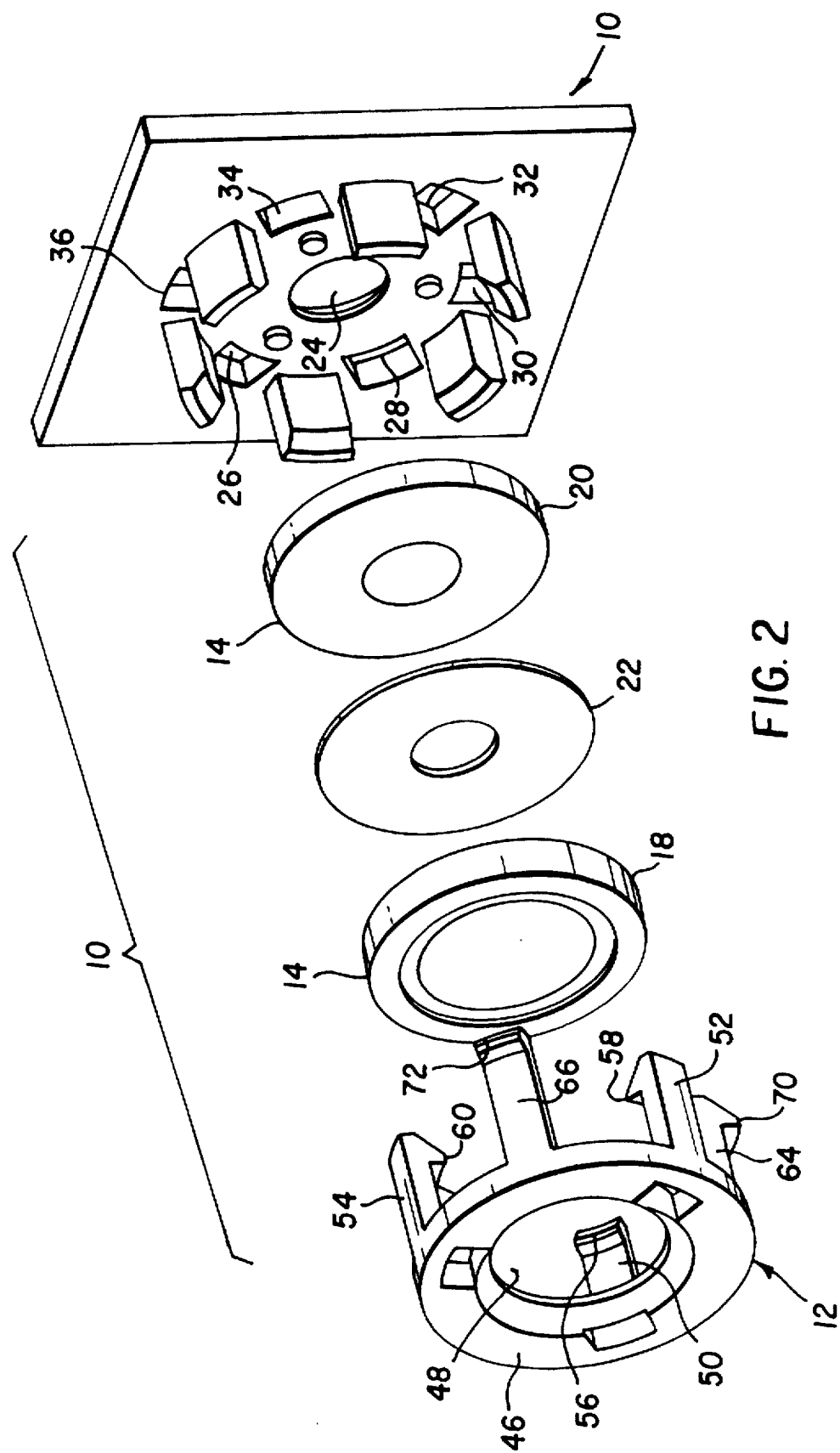
FIG. 2 is an exploded perspective view of the lens assembly, viewing the lens assembly from its front.
Figure 3:
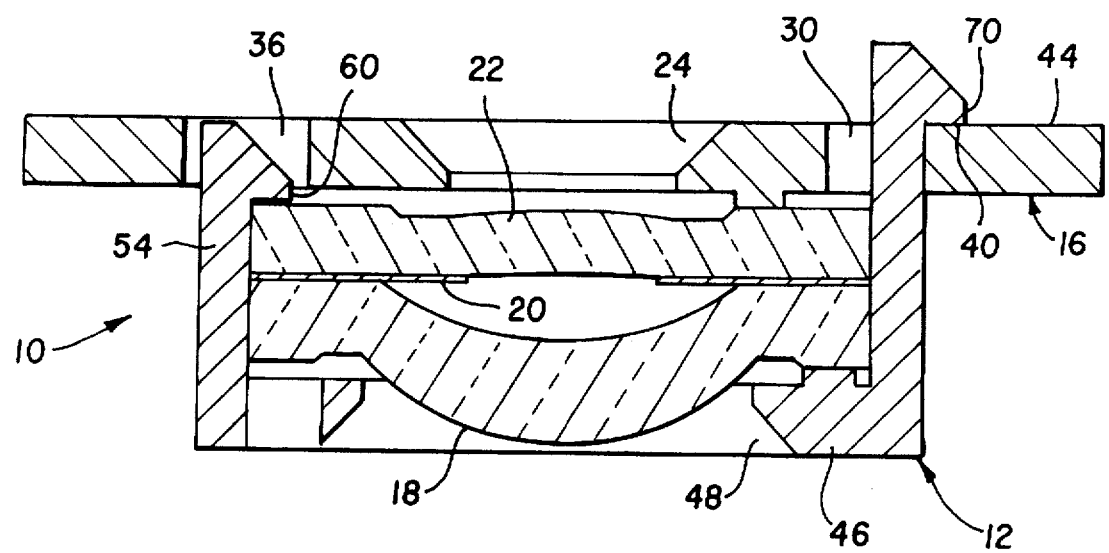
FIG. 3 is a sectional view of the lens assembly.

Referring now to the drawings, FIGS. 1–3 show a lens assembly 10 comprising a lens retainer 12, a taking lens 14, and a lens mount 16.

The taking lens 14 includes a pair of optically aligned front and rear lens elements 18 and 20. See FIGS. 1–3. An aperture stop 22 is located between the front and rear elements 18 and 20 in optical alignment with the two lens elements.

The lens mount 16 has a centered light-admitting opening 24, six evenly spaced holes 26, 28, 30, 32, 34, and 36 concentrically surrounding the light-admitting opening, and three engageable portions 38, 40 and 42 of a rear side 44 of the lens mount. The three engageable portions 38, 40 and 42 are located adjacent the holes 26, 30, and 34. See FIG. 1.

The lens retainer 12 includes a front ring 46 having a centered light-admitting opening 48, three resilient similar-length lens-engaging members 50, 52 and 54 having respective hook ends (snap hooks) 56, 58, and 60, and three resilient similar-length lens-mount-engaging members 62, 64, and 66 having respective hook ends (snap hooks) 68, 70, and 72. The three lens-engaging members 50, 52 and 54 longitudinally project parallel from the ring 46, and are evenly spaced concentrically around the light-admitting opening 48. The respective hook ends 56, 58, and 60 of the lens-engaging members 50, 52 and 54 are adapted to engage the rear lens element 20 to hold the rear lens element together with the aperture stop 22 and the front lens element 18 securely to the lens retainer 12 in optical alignment with the light-admitting opening 48. See FIG. 3. The three lens-mount-engaging members 62, 64, and 66 longitudinally project parallel from the ring 46 a greater distance than the three lens-engaging members 50, 52 and 54, are interposed between the respective lens-engaging members, and are evenly spaced concentrically around the light-admitting opening 48. The respective hook ends 68, 70, and 72 of the lens-mount-engaging members 62, 64, and 66 are adapted to protrude through the holes 26, 30 and 34 in the lens mount 16 to engage the engageable portions 38, 40 and 42 of the rear side 44 of the lens mount, as partially shown in FIG. 3, to connect the lens retainer 12 with the front and rear lens elements 18 and 20 and the aperture stop 22 intact to the lens mount. At the same time, the respective hook ends 56, 58, and 60 of the lens-engaging members 50, 52 and 54 are adapted to protrude into the holes 28, 32, and 36 in the lens mount 16, as partially shown in FIG. 3.

Preferably, the front ring 46, the lens-engaging members 50, 52 and 54, and the lens-mount-engaging members 62, 64, and 66 are are a single integrally-formed piece.

The invention has been described with reference to a preferred embodiment. However, it will be appreciated that variations and modifications can be effected by a person of ordinary skill in the art without departing from the scope of the invention.

PARTS LIST 10. lens assembly
12. lens retainer
14. taking lens
16. lens mount
18. front lens element 20. rear lens element
22. aperture stop
24. light-admitting opening
26. hole
28. hole
30. hole
32. hole
34. hole
36. hole
38. engageable portion
40. engageable portion
42. engageable portion
44. rear side
46. ring
48. light-admitting opening
50. lens-engaging member
52. lens-engaging member
54. lens-engaging member
56. hook end
58. hook end
60. hook end
62. lens-mount-engaging member
64. lens-mount-engaging member
66. lens-mount-engaging member
68. hook end
70. hook end
72. hook end

What is claimed is:

1. A lens assembly for a camera comprising a taking lens, a lens mount having a light-admitting opening and several engageable members, and a lens retainer having a light-admitting opening and several engageable members equal in number to said engageable members of the lens mount to permit the respective engageable members of the lens retainer and the lens mount to mutually engage to connect the lens mount and the lens retainer to one another with said taking lens located between the lens mount and the lens retainer in optical alignment with the respective light-admitting openings, is characterized in that:

said lens retainer has at least one retaining member that engages said taking lens to hold the taking lens securely to the lens retainer in optical alignment with said light-admitting opening of the lens retainer, to permit said lens retainer to be connected with said taking lens intact to said lens mount.

2. A lens assembly as recited in claim 1, wherein said lens retainer has a ring surrounding its light-admitting opening, said engageable members of the lens retainer are arranged to longitudinally project from said ring toward said lens mount, and said retaining member of the lens retainer is arranged to similarly project from said ring toward said lens mount but a lesser distance than said engageable members of the lens retainer.

3. A lens assembly as recited in claim 2, wherein said lens mount has a plurality of spaced holes surrounding said light-admitting opening of the lens mount which are equal in number to the respective engageable members of said lens retainer and the lens mount, said engageable members of the lens mount are located adjacent some of said holes and on a rear side of the lens mount remote from said taking lens, said engageable members of the lens retainer are arranged to extend from said ring through some of said holes to said rear side of the lens retainer to engage said engageable members of the lens mount, and said retaining member of the lens retainer is arranged to extend from said ring into one of said holes.

4. A lens assembly as recited in claim 2, wherein said taking lens includes a rear lens element and a front lens element, and said retaining member of the lens retainer is arranged to extend from said ring to engage said rear lens element to hold said front lens element securely between the rear lens element and said light-admitting opening of the lens retainer.

5. A lens assembly as recited in claim 4, wherein an aperture stop is located between said front and rear lens elements.

6. A lens assembly as recited in claim 1, wherein said lens retainer including said engageable members of the lens retainer and said retaining member of the lens retainer are a single integrally-formed piece.

7. A lens assembly for a camera comprising a taking lens, a lens mount having a centered light-admitting opening and several surrounding engageable members, and a lens retainer having a centered light-admitting opening and several surrounding engageable members equal in number to said engageable members of the lens mount to permit the respective engageable members of the lens retainer and the lens mount to mutually engage to connect the lens mount and the lens retainer to one another with said taking lens located between the lens mount and the lens retainer in optical alignment with the respective light-admitting openings, is characterized in that:

said lens retainer has several retaining members located between the respective engageable members of the lens retainer for engaging said taking lens to hold the taking lens securely to the lens retainer in optical alignment with said light-admitting opening of the lens retainer, to permit said lens retainer to be connected with said taking lens intact to said lens mount.

8. A lens retainer comprising:

a ring having a light-admitting opening;

several resilient lens-engaging members surrounding said light-admitting opening and longitudinally projecting from said ring; and several resilient lens-mount-engaging members surrounding said light-admitting opening and longitudinally projecting from said ring a greater distance than said lens-engaging members longitudinally project from said ring.

9. A lens retainer as recited in claim 8, wherein said lens-engaging members and said lens-mount-engaging members alternate around said light-admitting opening.

10. A lens retainer as recited in claim 8, wherein said ring and said lens-engaging and lens-mount-engaging members are a single integrally-formed piece.

* * * * *